(No Model.)  A. WALDBAUR.  3 Sheets—Sheet 1.
CENTRIFUGAL MACHINE.
No. 417,799. Patented Dec. 24, 1889.
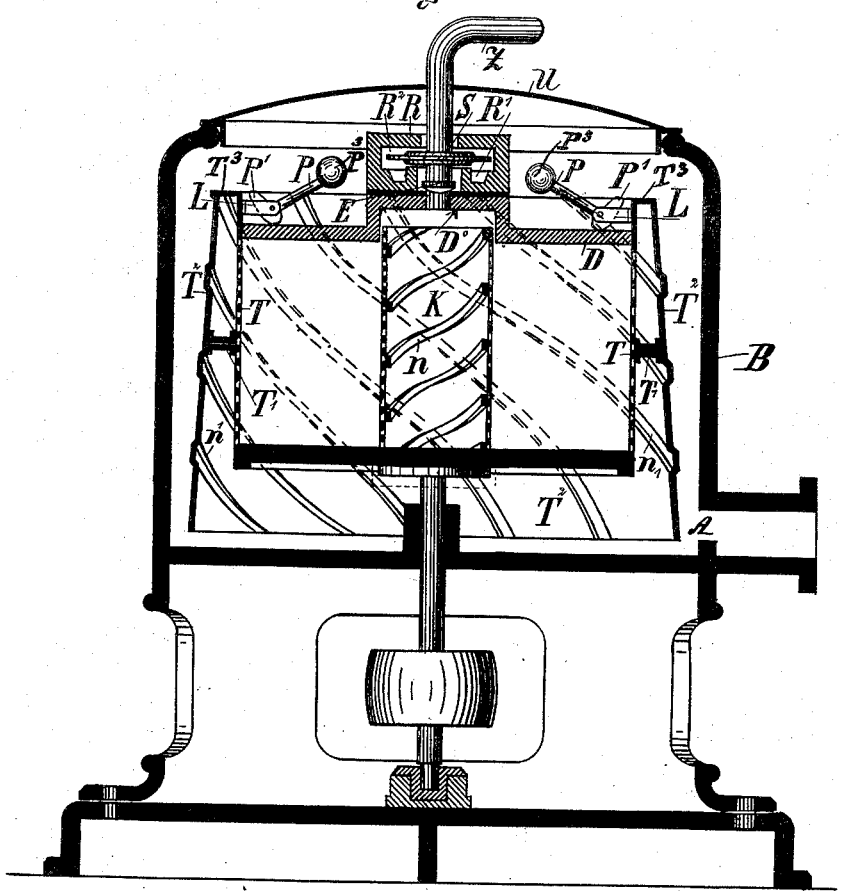
Fig. I.
Witnesses.
Wm. Wagner
H. Jonghmans
Inventor.
Adolphus Waldbaur
per Rueder & Prieur (No Model.)  3 Sheets—Sheet 2.
A. WALDBAUR.
CENTRIFUGAL MACHINE.
No. 417,799. Patented Dec. 24, 1889.
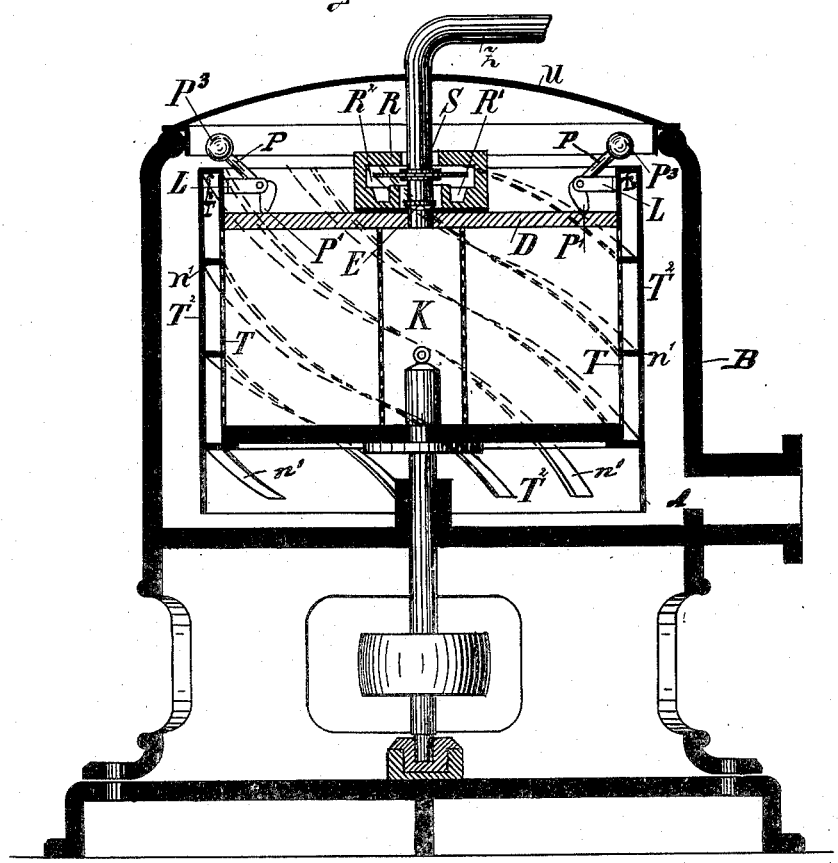
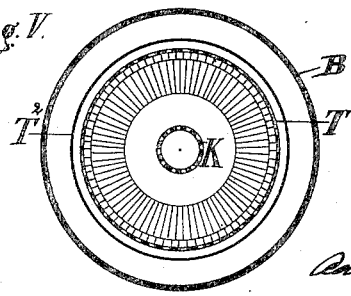

(No Model.) 3 Sheets—Sheet 3.
A. WALDBAUR.
CENTRIFUGAL MACHINE.
No. 417,799. Patented Dec. 24, 1889.
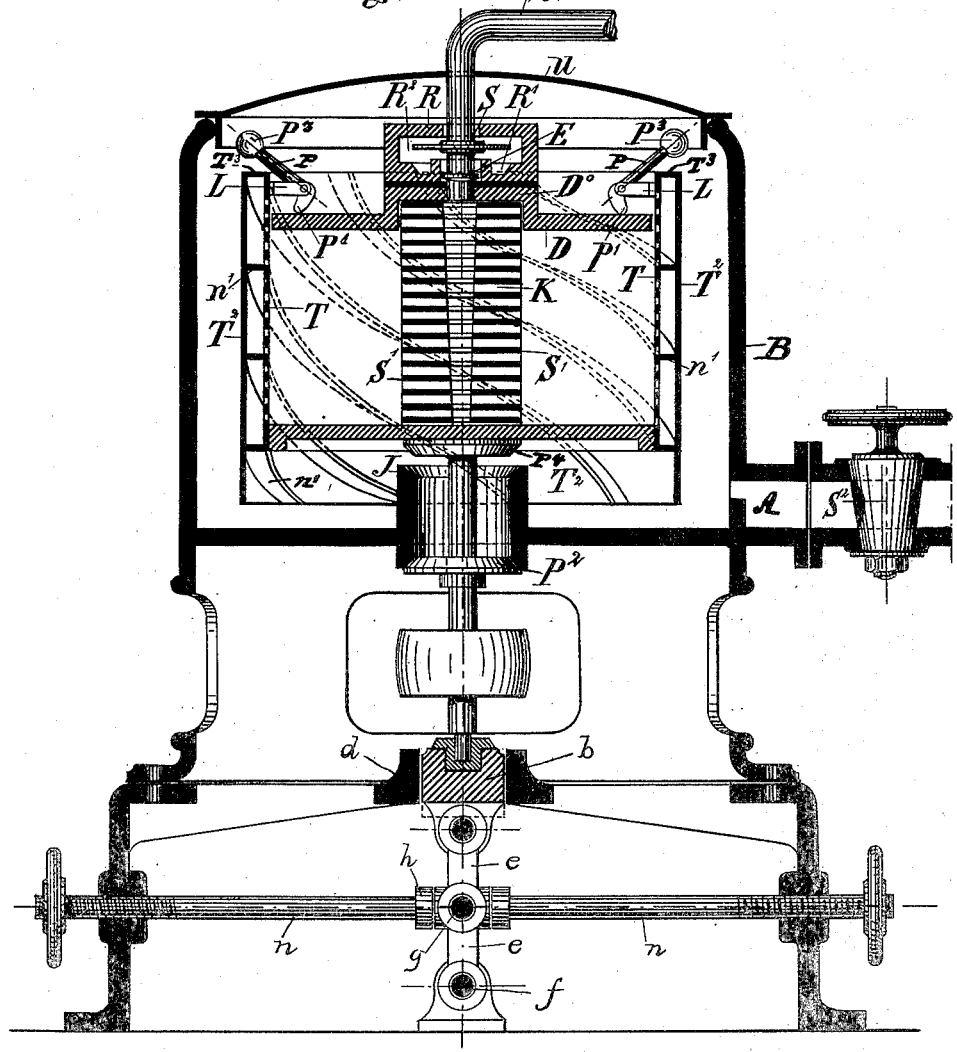
Witnesses.
Inventor.

UNITED STATES PATENT OFFICE.

ADOLPHUS WALDBAUR, OF STUTTGART, WÜRTEMBERG, GERMANY.

CENTRIFUGAL MACHINE.

SPECIFICATION forming part of Letters Patent No. 417,799, dated December 24, 1889.

Application filed February 27, 1889. Serial No. 301,358. (No model.)

*To all whom it may concern:*

Be it known that I, ADOLPHUS WALDBAUR, a citizen of Germany, residing at Stuttgart, in the Kingdom of Würtemberg, Germany, have invented certain new and useful Improvements in Centrifugal Machines, of which the following is a specification.

This invention relates to improvements in centrifugal machines for continuously washing, dyeing, drying, and impregnating and otherwise treating various materials and fabrics.

For the purpose of advantageously conducting away the liquors used in this apparatus (dyes, for example) the revolving drum or basket is fitted with the hereinafter-described improvements.

Figure I is a vertical section of my improved centrifugal machine. Figs. II and III are vertical sections of the same, showing modifications. Fig. IV is a plan of the central plates shown in Fig. III, and Fig. V is a sectional plan of the machine at a reduced scale.

The perforated basket T, which receives the material to be treated, is provided with an outer tight casing $T^2$. This casing is larger in diameter than the basket and is inverted over the same. It has a joint $T^3$, made at the upper part, with the basket T, and is stayed by stay-bolts T', so that it participates in the rotation of the basket. The outer casing $T^2$, which is longer than the basket, dips by its lower edge into the outlet-channel A of the framing or casing B of the centrifugal apparatus. The passage of the liquid in said channel may be stopped and regulated by a cock $S^2$, Fig. III, or other suitable means. The evacuation of the liquids received in the outer casing is caused either by making the same flaring toward the lower end and provided with furrows n', as shown at Fig. I, or by fitting the inner side thereof with ribs or guides, as shown at Figs. II and III, made helicoidal, and which force the liquid downward, allowing it to flow gently into the evacuation-channel A. The impregnating-liquids are led through the lid into the center of the basket, and are conducted thence by suitable means to the material to be treated.

In order to make a tight joint for the feed-pipe Z at E, the following arrangement is adopted: Upon the lid D at the mouth of the feed-pipe there is a round receiver R, the sectional shape of which is seen in the drawings. It consists in a circular receiver R' and a circular chamber $R^2$ placed above it. On the feed-pipe Z is provided a disk S, having sufficient play in the chamber $R^2$, (with reference to the vibrations of the basket or drum.) The reservoir R' is filled with a liquid, which, when the basket rotates, rises in the chamber $R^2$, and surrounding and inclosing thereby the edge or periphery of the disk S, thus forming a hydraulic seal or tight joint for the bottom of the pipe Z.

In order to cause the lid D, which closes the basket, to press automatically upon the material, a lever arrangement is provided as follows: The inner side of the basket is provided with a suitable number of lugs L, to which pressure-levers P P' are hinged after the lid D is let down. The construction of these levers is preferably such that one end P of said lever, turned toward the center before rotation begins, is provided with a weight $P^3$, while the other shorter end P' forms an eccentric or cam. When the drum rotates, these levers turn in a vertical direction, as, by reason of the centrifugal power, the weight tends to move outward, and thus their eccentrics P' force the lid downward.

To produce and preserve a free space within the basket, serving also to admit of the inflow of the reagents required for treating the material and to cause its suitable division, a device is provided in the center of the drum, consisting in a perforated cylinder K, on the inner side of which upwardly leading or rising ribs or grooves n, of spiral form, are provided. The liquid is thrown upon the bottom of the drum, and thence forthwith propelled by centrifugal force against the side of the cylinder K, directed upward by the ribs or grooves n when rotation is rapid, spread over the several small perforations, and by these conducted to the material outside cylinder K in the basket T. The distribution device may, however, consist in disks S', with radial channels r, (see Fig. IV,) having an aperture at the center which is of such width that a portion of the current of liquid which is admitted is retained, received by the channels, and is by centrifugal force led to the material.

To prevent interference with the compression of the spreading device K in case the same is not elastic, the lid D is fitted with a dome $D^0$, which permits the necessary free play.

As it is desirable for some materials to use the centrifugal apparatus in vacuo or under steam-pressure, the bottom of the apparatus or the evacuation-channel is fitted with a packing-hoop J, Fig. III, upon or against which the correspondingly-turned bottom $P^4$, attached to the basket, or the disk $P^2$, attached to the central shaft, runs tight, making a tight joint. When steam is used, the basket is lowered, so that the disk $P^4$ rests upon the box J, making a tight joint assisted by the pressure of the steam in the interior, and when a vacuum is used the basket is lifted, so that the disk $B^2$ bears against the under side of the packing-box J, forming thus a tight joint, assisted by the pressure of the external atmosphere. When the disk $P^4$ rests upon the top of the box J, or the disk $P^2$ bears against the bottom edge of said box J, these disks act similar to valves, resting and their seats capable of turning freely thereon, and at the same time forming tight joints. The spindle thereof may be raised or lowered by suitable means—say by making the step of the same vertically adjustable by a screw or angle-lever or the like.

In the position shown in Fig. I the drum rotates freely, the spindle to which the basket T is attached passing through a boss in the bottom of the casing B, which may be arranged with a stuffing-box, if desired. In Fig. III, the bottom of the spindle of the basket T rests upon a step b, capable of a vertical motion in the guide d of the frame. e e' are two levers, the end of the upper lever e being hinged to the under side of the step b, and the lower end of the lever e' turning on a fixed center f, arranged at the bottom of the machine. The central joint g of these levers e e' is surrounded by a yoke h, attached to rods n n, by which this central joint may be moved toward one or the other side. When the levers e e' are in a straight line, as shown in Fig. III, the disk $P^2$ bears against the lower edge of the box J; but when the central joint g is moved sidewise the step and spindle, and consequently the basket, will be lowered until the disk $P^4$ bears upon the upper edge of the box J.

The outlet A of the centrifugal apparatus can be regulated or hermetically closed by a stop-cock $S^2$, Fig. III, while the top of chamber B may be hermetically closed by a suitable lid U.

These improvements are claimed not only for such centrifugal machines, in which the drum is supported in a foot-step and receives its turning motion by a pulley fixed below the drum, but also for such apparatus which have a suspender-drum and a perforated or not perforated axle, with the driving-pulley above the drum.

What I claim is—

1. In a centrifugal apparatus, the combination of a perforated drum T with a casing $T^2$, placed over the basket or drum and connected and rotating therewith, and provided with guiding-ribs $n'$, for the evacuation or discharge of the liquids, said casing descending so far that it dips into the liquid flowing off when the same is in the evacuation-channel, thus forming a hydraulic seal, substantially as specified.

2. In a centrifugal machine, in combination with the basket or drum T and cover D, the pressure-levers P P', having weights $P^3$, substantially as specified.

3. In a centrifugal machine, the combination, with the cover D, of the basket T and the inlet-pipe Z, the disk S, attached to the pipe Z, and the receiver R, attached to the cover D, comprising the circular reservoir R' and chamber $R^2$, as and for the purpose described.

4. In a centrifugal machine, in combination with the drum T and cover D, the perforated central cylinder K, provided with ribs n, substantially as specified.

5. In a centrifugal machine, in combination with the outer casing B, the packing-hoop J, and bottom plate $P^4$, attached to the end of the drum T, and the disk or plate $P^2$, attached to the driving-spindle, substantially as and for the purpose set forth.

ADOLPHUS WALDBAUR.

Witnesses:
G. DEDREX,
A. M. CICKMAN.